(12) United States Patent
Zifan et al.

(10) Patent No.: US 12,551,159 B2
(45) Date of Patent: Feb. 17, 2026

(54) ANALYSIS AND DISPLAY OF FUNCTIONAL LUMEN IMAGING PROBE (FLIP) DATA

(71) Applicant: THE REGENTS OF THE UNIVERSITY OF CALIFORNIA, Oakland, CA (US)

(72) Inventors: Ali Zifan, La Jolla, CA (US); Ravinder K. Mittal, La Jolla, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 370 days.

(21) Appl. No.: 18/034,432

(22) PCT Filed: Oct. 28, 2021

(86) PCT No.: PCT/US2021/057151
§ 371 (c)(1),
(2) Date: Apr. 28, 2023

(87) PCT Pub. No.: WO2022/094153
PCT Pub. Date: May 5, 2022

(65) Prior Publication Data
US 2024/0016443 A1  Jan. 18, 2024

Related U.S. Application Data

(60) Provisional application No. 63/106,493, filed on Oct. 28, 2020.

(51) Int. Cl.
*A61B 5/00* (2006.01)
*A61B 5/107* (2006.01)
*G06T 7/00* (2017.01)
*G06T 7/136* (2017.01)

(52) U.S. Cl.
CPC .......... *A61B 5/4222* (2013.01); *A61B 5/1076* (2013.01); *A61B 5/6852* (2013.01); *A61B 5/742* (2013.01); *G06T 7/0012* (2013.01); *G06T 7/136* (2017.01); *G06T 2207/30092* (2013.01)

(58) Field of Classification Search
None
See application file for complete search history.

(56) References Cited

U.S. PATENT DOCUMENTS

| | | | |
|---|---|---|---|
| 2005/0049509 A1 | 3/2005 | Mansour | |
| 2018/0008156 A1* | 1/2018 | Pandolfino | A61B 1/273 |
| 2018/0182092 A1* | 6/2018 | Drozdzal | G06T 7/0012 |

OTHER PUBLICATIONS

Measuring length-tension function of the anal sphincters and puborectalismuscle using the functional luminal imaging probeLori J. Tuttle et al. (Year: 2018).*

(Continued)

*Primary Examiner* — Nancy Bitar
(74) *Attorney, Agent, or Firm* — Kaplan Breyer Schwarz LLP (57) ABSTRACT

A method for analyzing and displaying functional lumen imaging probe (FLIP) measurement data includes receiving FLIP measurement data. A heatmap or topograph of the measurement data is generated and displayed to thereby create an image of a diameter along the lumen. The image is segmented to display only diameters of the lumen within a range of diameter values specified by a user.

16 Claims, 11 Drawing Sheets

(56) References Cited

OTHER PUBLICATIONS

Loop analysis of the anal sphincter complex in fecal incontinent patients using functional luminal imaging probe Ali Zifan, 1 (Year: 2020).*

Zifan et al. American Journal of Physiology-Gastrointestinal and Liver Physiology. Loop analysis of the anal sphincter complex in fecal incontinent patients using functional luminal imaging probe. Nov. 18, 2019 (Nov. 18, 2019). [retrieved on Dec. 30, 2021]. Retrieved from the Internet: <URL: https://journals.physiology.org/doi/pdfplus/10.115zfajpgi.00164.2019> pp. G66-G76.

Tuttle et al. American Journal of Physiology-Gastrointestinal and Liver Physiology. Measuring length-tension function of the anal sphincters and p1,1borectalis muscle using the functional luminal imaging probe. Aug. 30, 2018 (Aug. 30, 2018). [retrieved on Dec. 30, 2021]. Retrieved from the Internet: <URL: https://journals.physiology.org/doi/pdf/10.1152/ajpgi.00414.2017> pp. G781-G787.

McMahon et al. American Journal of Physiology-Gastrointestinal and Liver Physiology. The functional lumen imaging probe (FLIP) for evaluation of the esophagogastric Junction. Aug. 31, 2006 (Aug. 31, 2006). (retrieved on Dec. 30 2021]. Retrieved from the Internet: <URL: https://journals.physiology.org/doi/pdf/10.1152/ajpgi.00311.2006> pp. G377-G384.

* cited by examiner

ANALYSIS AND DISPLAY OF FUNCTIONAL LUMEN IMAGING PROBE (FLIP) DATA

FIELD OF INVENTION

The present invention relates generally to methods for processing, visualizing, and analyzing pharyngeal, esophageal or pelvic floor function captured by Functional Lumen Imaging Probe (FLIP) recordings.

BACKGROUND

Functional Lumen Imaging Probe (FLIP) testing is a recent addition to the list of tests available in the diagnose of symptoms pertaining to the esophagus, i.e., dysphagia, chest pain, heartburn and gastroesophageal reflux. A FLIP device obtains simultaneous cross sectional area measurements of the esophagus using an impedance planimetry technique. Sensor(s) are arranged along a catheter or probe that fills with saline and can display a geometry of an esophageal lumen and provide measure(s) of pressure. One example of a FLIP device is EndoFLIP® by Medtronic of Minneapolis, Minnesota. Another example may be found in U.S. Pat. Appl. No. 2018/0008156.

Upper GI series (barium swallow or esophagogram) using X-ray fluoroscopy and upper endoscopy (EGD) are the first line diagnostic testing of esophageal symptoms, following which esophageal manometry (high resolution manometry) is done routinely to diagnose entities such as, achalasia esophagus, diffuse esophageal spasm, nutcracker esophagus (jackhammer esophagus), hypotensive/ineffective esophageal motility disorders. FLIP testing, which is a relatively recently developed technique, is able to diagnose the majority of esophageal motor disorders with almost similar sensitivity and specificity as high-resolution manometry and may eventually replace it. The advantage of FLIP testing is that it can be done under conscious sedation (making it patient friendly) and at the time of upper endoscopy (making it more efficient, one hospital visits as compared to two visits, one for EGD and the other for manometry). Placement of the manometry catheter (usually through the nose) can be quite uncomfortable for the patient. FLIP testing is also important for the surgeons in the operation theaters, e.g., to assess the adequacy of esophageal myotomy in patients with achalasia esophagus and to assess the degree of tightness of fundoplication (Nissen Fundoplication) during antireflux surgery. It is not surprising therefore that FLIP testing has gained wide acceptance very quickly with more than 170 centers in the USA using this type of testing.

SUMMARY

In accordance with one aspect of the subject matter described herein, a non-transitory computer-readable medium is provided that includes instructions for causing a computing environment to perform a method for analyzing and displaying functional lumen imaging probe (FLIP) measurement data. In accordance with the method, FLIP measurement data is received and then a heatmap or topograph of the measurement data is generated and displayed to thereby create an image of the diameter of organ along its length. The image is segmented to display only luminal diameter within the range of diameters values specified by a user.

In accordance with another aspect of the subject matter described herein, the lumen is selected from the group of diameters from organs such as esophagus, vagina or anal canal.

In accordance with another aspect of the subject matter described herein, the segmenting is performed by thresholding the regions of the image.

In accordance with another aspect of the subject matter described herein, the method further includes displaying one or more parameter values derived from the FLIP measurement data in response to a user selection of a portion of the heatmap or topograph, the parameter values being selected from the group including pressure, diameter, distensibility, tension and volume.

In accordance with another aspect of the subject matter described herein, the method further includes generating a display that simultaneously presents distensibility and diameter values of the lumen.

In accordance with another aspect of the subject matter described herein, the method further includes panning or zooming a portion of the diameter image in accordance with the user request.

In accordance with another aspect of the subject matter described herein, the method further includes generating and displaying a time derivative heatmap of the image of the diameter of the lumen.

In accordance with another aspect of the subject matter described herein, the method further includes simultaneously displaying the image of the diameter of the lumen and pressure-radius loops.

In accordance with another aspect of the subject matter described herein, the method further includes simultaneously displaying the image of the diameter of the lumen and tension-radius loops.

In accordance with another aspect of the subject matter described herein, the method further includes simultaneously displaying pressure-radius-tension-distensibility waveforms.

In accordance with another aspect of the subject matter described herein, the method further includes generating and displaying a 2D heatmap of distensibility.

In accordance with another aspect of the subject matter described herein, the method further includes generating and displaying a 3D heatmap of distensibility.

In accordance with another aspect of the subject matter described herein, the method further includes generating and displaying a diameter-pressure plot with pressure being displayed as a heatmap and diameter for each data channel being superimposed on the heatmap of pressure.

In accordance with another aspect of the subject matter described herein, the method further includes generating and displaying a distribution of tension as a heatmap or topograph.

In accordance with another aspect of the subject matter described herein, the method further includes generating and displaying gird images of the lumen as a series of concentric circles.

In accordance with another aspect of the subject matter described herein, the method further includes generating and displaying grid images of the lumen as a series of concentric circles that represent a single point in time, each of the concentric circles being representing as a single data channel.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject

DETAILED DESCRIPTION

One of the limitations of FLIP systems is that there is no computer software program available to adequately display and analyze FLIP recordings after the testing is complete. The basic program (code) available through the Northwestern University Chicago group, and the original program provided by Crosspon (the original manufacturer of a FLIP device), provide limited information and are not user friendly, especially for researchers/clinicians with little or no background of computer programming. Unlike high-resolution manometry (HRM), where one can visualize and analyze these recordings after the actual recordings are completed using programs such as the mano-view program available from Medtronics or the MMS available from Laborie and Sandhill available from Diversatek, no such software program exists for the FLIP recordings.

Visualization and analysis software of the type described herein can make FLIP testing more popular among clinicians and researchers. Clinicians can be more certain of the parameters provided to make accurate diagnosis to make therapeutic decision. Researchers will be able to further refine already published parameters. Such a software therefore has the potential to advance the understanding of esophageal physiology and pathophysiology.

Methods and data visualizations according to principles described herein address the problems described above and relate to new ways of displaying and analyzing data extracted from the functional luminal imaging probe (FLIP).

Figure 1:
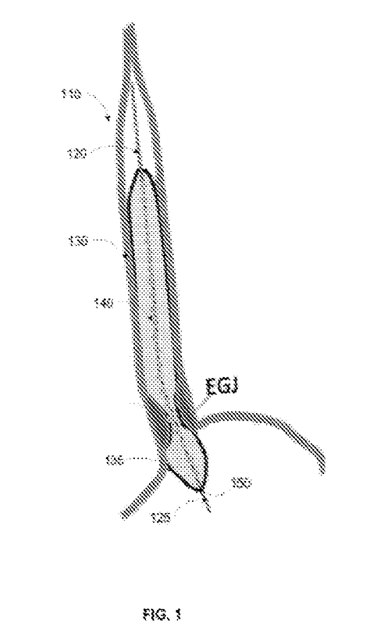
FIG. 1 shows one example of a functional lumen imaging probe (FLIP).

FIG. 1 illustrates one example of a functional lumen imaging probe (FLIP) 110. The FLIP 110 includes a catheter 120 and an infinitely compliant bag 130 mounted on a distal end 125 of the catheter 120. The bag 130 houses a plurality of ring electrodes 140 spaced throughout the bag 130 along the catheter 120, and a solid-state pressure transducer 150 positioned at the distal end 135 of the bag 130. The bag 130 can be tapered at both ends to form a cylindrical shape at the center of the bag 130, for example. Additional details concerning the FLIP device shown in FIG. 1 may be found in U.S. Pat. Appl. No. 2018/0008156.

In certain examples, the FLIP assembly 110 forms a high-resolution impedance planimetry segment (e.g., 8-cm, 16-cm long, etc.) that can be positioned with the distal end 125 across a patient's esophagogastric junction (EGJ) during endoscopy, for instance. More generally, the FLIP assembly 110 can be used to examine esophageal, vaginal or anal canal functions. Simultaneous or near simultaneous diameter and intra-bag pressure measurements can be obtained during stepwise bag distensions (e.g., from 5-60 ml, etc.) and exported (e.g., to a specialized MATLAB™ program, etc.) to generate FLIP topography plots. Distension volume and pressure thresholds can be identified for the start of esophageal contractions (reactivity) and for the onset of repetitive antegrade contractions (RACs) or repetitive retrograde contractions (RRCs), which likely represent secondary peristalsis, for example. Contraction duration, interval, magnitude, velocity, and associated pressure-changes can be measured above the EGJ (e.g., at 8 and 3-cm, etc.) during RACs and RRCs. Thus, distension-induced esophageal contractions can be assessed utilizing FLIP topography. Incorporation of FLIP provides an adjunctive tool for esophageal distensibility and motility assessment.

The output of the FLIP device may include the following data for each data channel (where each pair of electrodes provides one data channel): 1) Time (Timestamp), 2) Entry Number, 3) Pump Status (Inflating/Deflating/Stopped), 4) The diameters of the bag (and hence the diameter of the lumen in which it is inserted) at locations of Electrode 1 through Electrode N, where N is the number of electrodes (e.g., 17), 5) BP1—Balloon pressure, 6) BV—Balloon volume, 7) saline temperature.

The subject matter described herein is predicated in part on the finding that the 7 aforementioned parameter values obtained from a subject during a FLIP study provide valuable markers for the assessment of either esophageal, vaginal or anal canal function in a subject.

The data obtained from the FLIP device can be analyzed to generate plots of various features that can be displayed in a variety of different ways. These plots can be generated by software that can be executed on any suitable and convenient computer processing device, which, may include, without limitation, personal computers, tablets, smartphones, smart glasses and other hand-held or wearable devices. A number of illustrative plots that can be generated and displayed will be described below.

Figure 2:
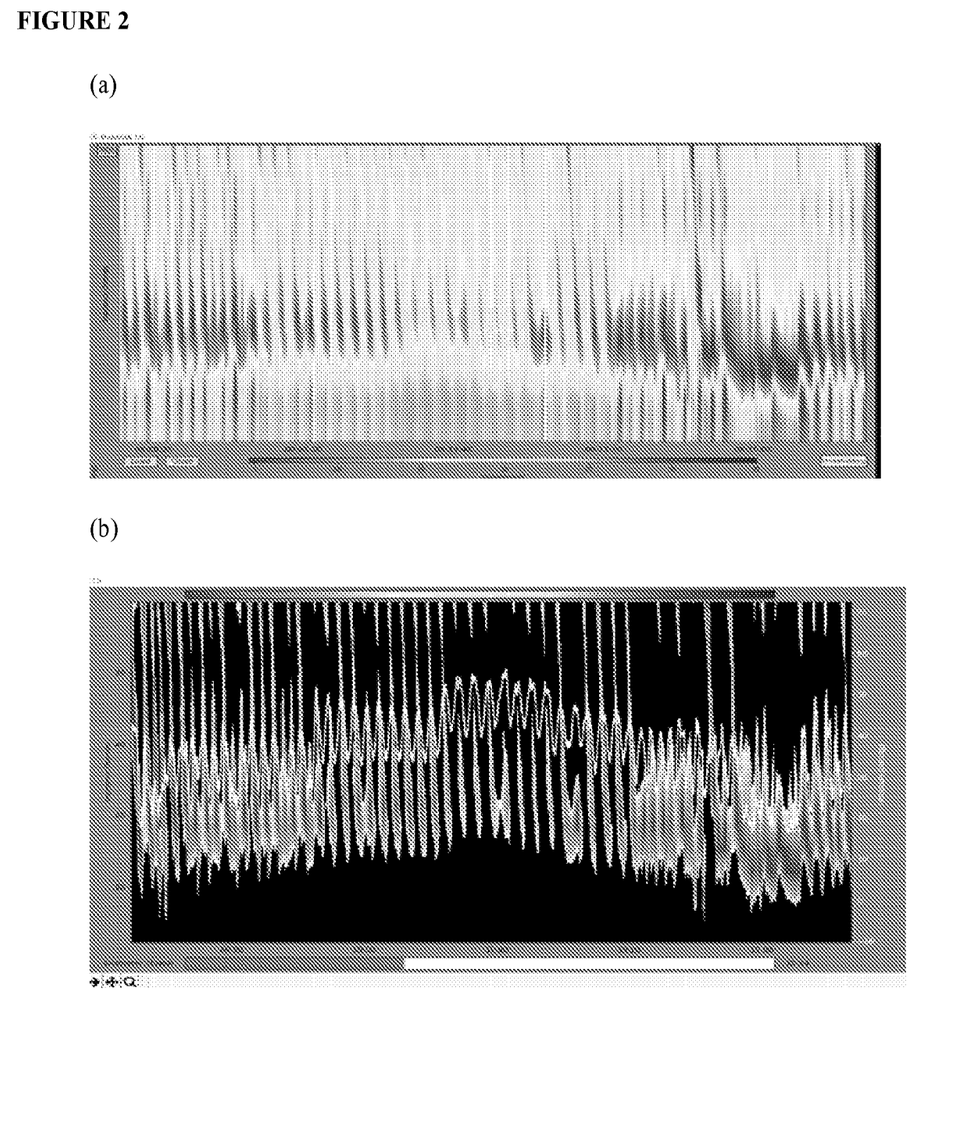
FIG. 2a illustrates an example of a display of a diameter matrix (as a heatmap/topograph) that presents all the data for all diameters and FIG. 2b shows the same example after segmentation using user defined diameter thresholds.
Figure 3:
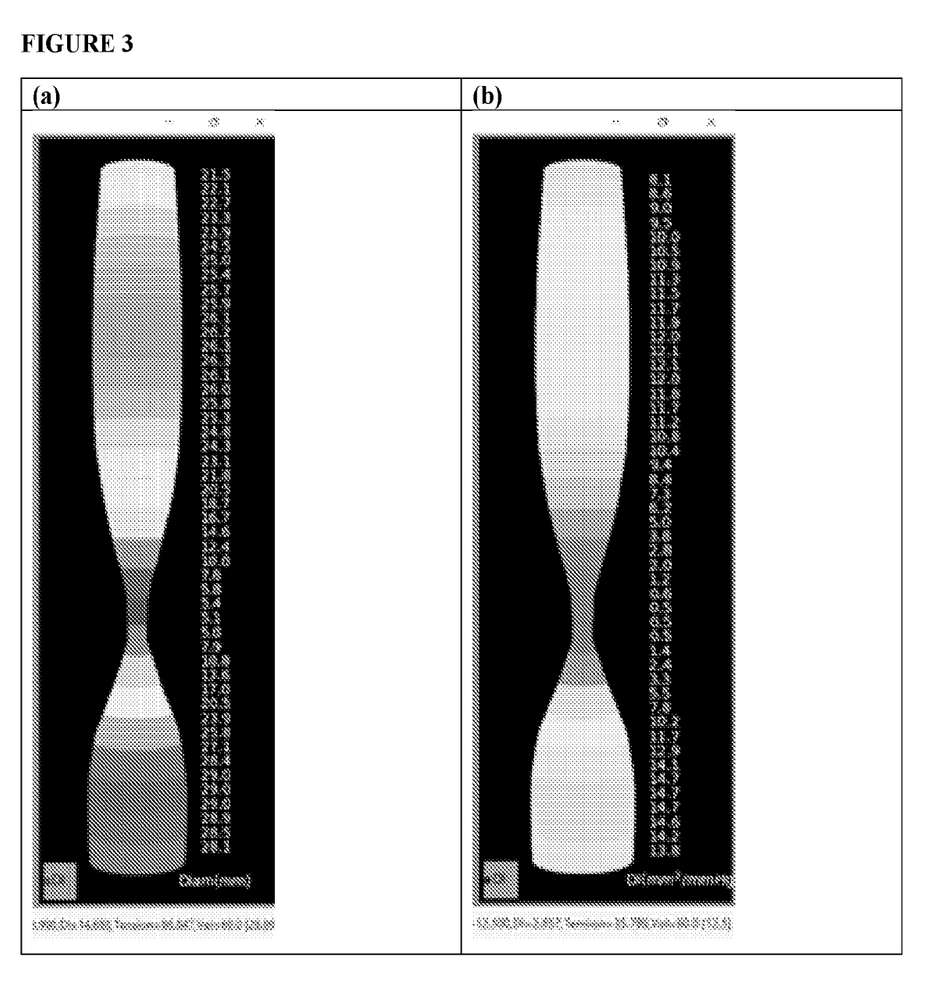
FIG. 3a shows an example of a cylindrical display provided by the FLIP device using diameter data.
FIG. 3b shows an example of a cylindrical display provided by the FLIP device using distensibility data.

In one aspect, the systems and method described herein provide a method for the interactive segmentation of multichannel diameter measurements, displayed as an image. Segmentation is the partitioning of an image into meaningful regions, most frequently to distinguish objects or regions of interest ("foreground") from everything else ("background"). The simplest property that pixels in a region can share is intensity, which can be used to depict the diameter of the esophagus or other portion of the gastrointestinal tract. That is, the intensity can vary (increase or decrease) as the diameter of the esophagus increases or decreases. So, a natural way to segment such regions is through thresholding, the separation of light and dark regions. Thresholding creates binary images from diameter images by turning all pixels below some threshold to zero and all pixels about that threshold to one. If g (x, y) is a thresholded version of f (x, y) at some global threshold T, i.e. it is equal to 1 if f (x,y)≥T, and it is zero otherwise. Here x, y refers to the location (row and column position) of a certain pixel in the diameter image. A sample result is shown in FIG. 2. In particular, FIG. 2a shows an example of imported diameter measurements from the FLIP device shown as a heatmap that presents all the data for all diameters. FIG. 2b shows the same example after segmentation using user defined diameter thresholds, where the black regions correspond to diameters that have been eliminated. The thresholded regions are masked out and shown in black. The vertical white line allows the user to show a cylindrical display of the measurements at one point in time, which is shown below in FIG. 3. Both FIGS. 2a and 2b and as well as the remaining figures below are depicted in pseudo-color.

In yet another aspect, the systems and methods described herein allow a post-study static 'Cylindrical visualization' of both the diameter and Distensibility (DI) of the esophagus or other portion of the gastrointestinal tract at one point in time, where DI is defined as the circular cross-sectional area of a cross-section of the balloon divided by the pressure. The shape of the cylinder is based on the diameter and the superimposed color heatmap can be either the diameter itself or DI, based on user input. Above visualization is achieved by use of a vertical line, usually placed in the middle of the display. This can be achieved, for example by user selection of the line, such as by using a '2 click' process on the line, for example. The first click enables the line and allows the user to move it to the desired location on the recording. The second click on the line allows the cylindrical display of the point in time. An example of a cylindrical display of the FLIP device is shown in FIG. 3a using diameter data and in FIG. 3b using distensibility data. In particular, FIG. 3a shows a cylindrical display of the diameter at one time point of the recording. The color variation on the cylinder defines the value of the diameter at a particular level on the cylinder. FIG. 3b shows a cylindrical display of distensibility at one time point of the recording. The speed of the motion will depend on the computational abilities e.g., CPU and GPU) of the computer (e.g., CPU and GPU) that is used.

In another aspect, by hovering a user interface device such as a computer mouse (or by using a stylus on a touchscreen) over the diameter topograph, the display can show the following parameters in real time show: time, channel number, Pressure, Diameter, DI, Tension (i.e., pressure multiplied by radius) and Volume.

In another aspect, in a main display area, another subplot may be presented aside from the diameter heatmap (image). In this case, when the user makes a selection from (e.g., clicks on) a dialog box, either the volume of the balloon or the pressure may be visualized as a waveform, either separately, or simultaneously, possibly overlayed on each other.

In another aspect, the user can 'zoom' in on a particular region, either by defining a region with a user interface device (e.g., a joystick, computer mouse, stylus), on either the diameter heatmap or the Volume/Pressure waveform displays.

In yet another aspect, the user can 'Pan' the diameter heatmap, to view other segments of the subject recording, using a user interface device (e.g., a joystick, computer mouse, stylus), on either the diameter heatmap or the Volume/Pressure waveforms.

Figure 4:
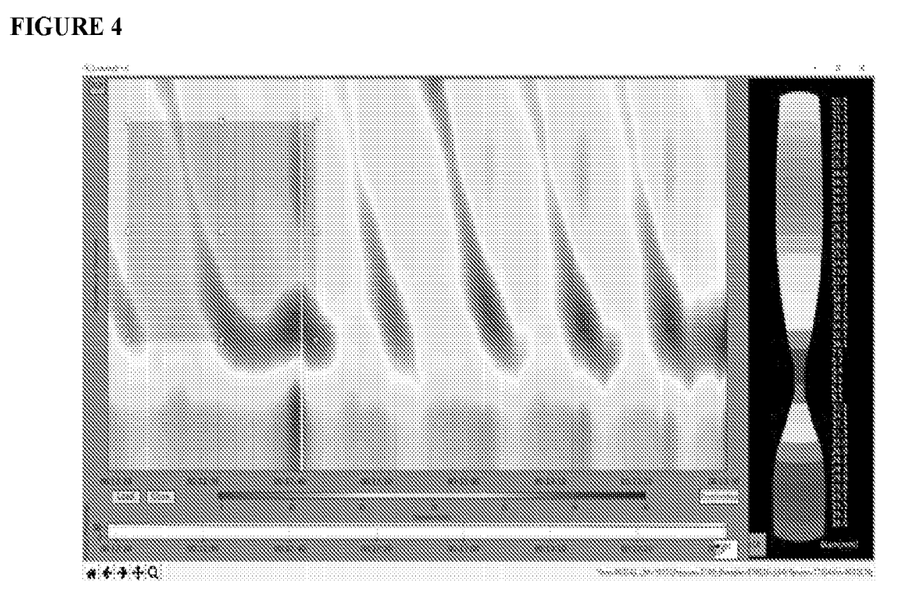
FIG. 4 shows an example of a region of interest (ROI) selected by the user on the diameter heatmap.

In another aspect, detailed data analysis in the software is achieved by the user defining a region of interest (ROI). In some cases this may be accomplished by the user selecting (e.g., clicking on) the ROI button, which in one implementation can be located in the upper left corner. By defining a region of interest, a draggable rectangle appears on the screen, allowing the user to define their desired regions to be analyzed and post-processed. A sample ROI selected by a user is shown in FIG. 4. In one particular implementation, when the user selects and holds the ROI button, the user can expand the ROI to the desired width or height, after which the user can release the ROI button.

Figure 5:
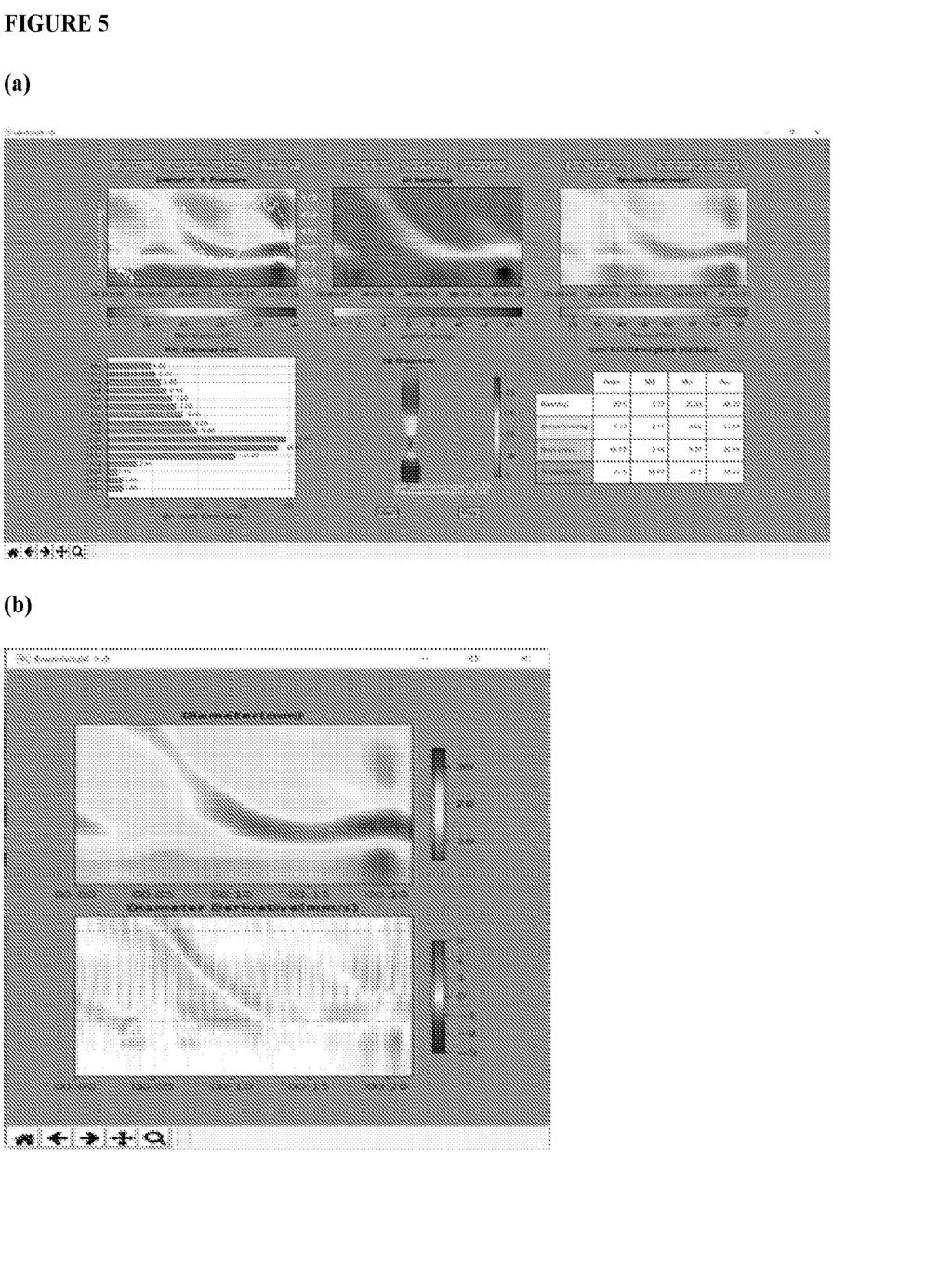
FIG. 5a shows one example of an analysis window that may be presented by the software.
FIG. 5b shows a time derivative of the diameter heatmap.

In another aspect, a 'diameter change rate' (time derivative) heatmap can be obtained using an adjusted colormap, allowing the user to observe increasing or decreasing diameter change values in the recording. A sample analysis window that may be displayed for this purpose is shown in FIG. 5(a). The upper left panel of the analysis window shows the pressure at the user selected ROI superimposed on the diameter. Also shown in FIG. 5(a) is a distensibility heatmap of the selected region by the user, a tension heatmap of the user defined region of interest, the time it takes for the diameter to reach a minimum on each channel of the recording, and a 3D display of a time instance in the user selected ROI, where the diameter reaches a minimum. FIG. 5(b) shows a time derivative of the diameter heatmap for assessing increasing or decreasing diameter rates of change. This is obtained by calculating the derivative of the multi-channel diameters with respect to time.

Figure 6:
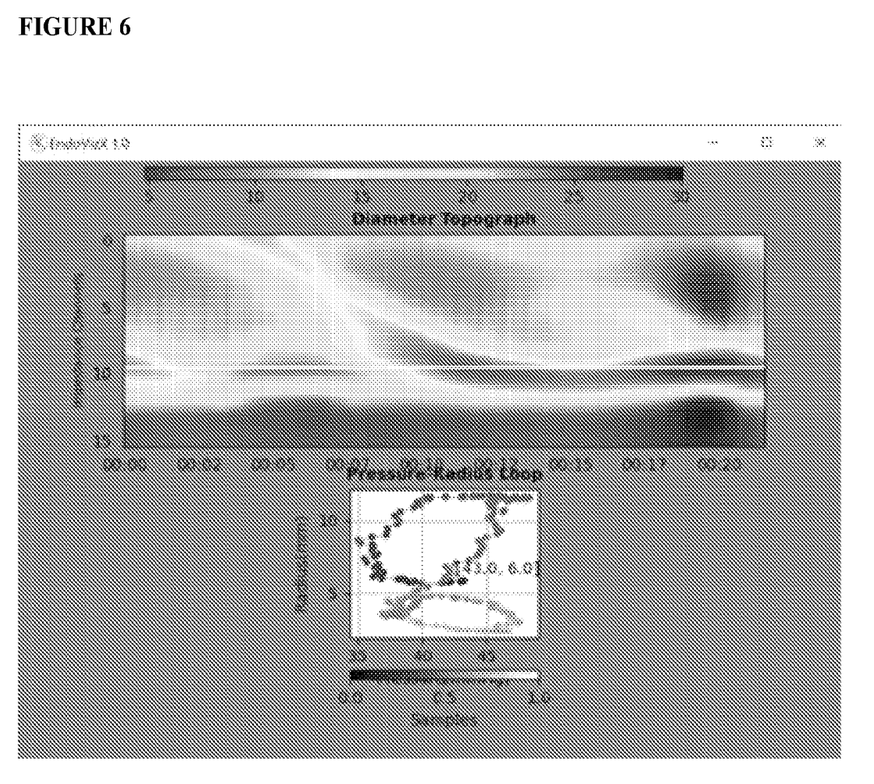
FIG. 6 shows an interactive pressure-radius loop analysis of pressure-diameter data.

In another aspect, an analysis feature allows the simultaneous visualization of the diameter heatmap and pressure-radius loops. The purpose of this feature is to allow the study of pressure and length changes with respect to each other. In the relevant window, by locking the horizontal line on the diameter heatmap, and moving it up or down, one can see the length-pressure relationship along the length of the FLIP probe. A sample result is shown in FIG. 6, which shows an interactive pressure-radius loop analysis of pressure-diameter data. The loop or contour can be color-coded based on time. By clicking and moving the horizontal white line, the user can see the pressure-radius loops and its centroid at a certain channel of a multichannel recording.

In another aspect, an analysis feature allows the simultaneous visualization of the diameter heatmap and tension-radius loops. The purpose of this feature is to allow the study of tension and length changes with respect to each other. In the relevant window, by locking the horizontal line on the diameter heatmap and moving it up or down, one can visualize the length—tension relationship along the length of the FLIP probe. The loop or contour can be color-coded based on time.

Figure 7:
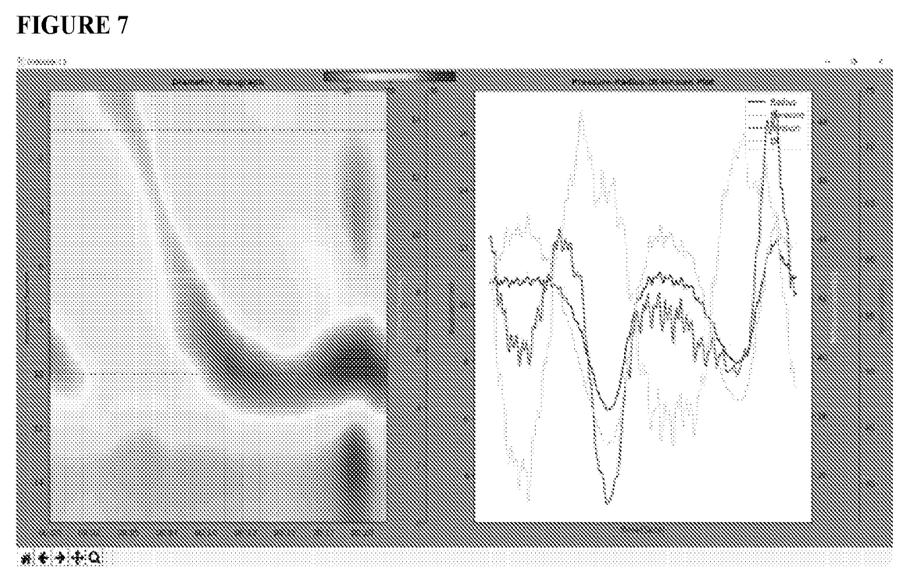
FIG. 7 shows an interactive display of pressure-radius-tension-distensibility multi-waveforms.

In another aspect, the software analysis window allows simultaneous visualization of Pressure-Radius-Tension-Distensibility waveforms together. As described earlier, a horizontal line overlayed on the diameter heatmap allows the display of the described features, with each one having their corresponding scales. By clicking on the horizontal lines on the diameter heatmap (topograph), the user can horizontally move the line to the appropriate channel, and with another click display the results on a side panel of the figure. FIG. 7 shows one example of an interactive visualization of Pressure-Radius-Tension-Distensibility multiwaveforms. In particular, FIG. 7 shows a simultaneous (waveform) visualization of pressure, radius, tension and distensibility, with their corresponding individual y-axis scales, along the length of the FLIP catheter. This can be achieved by the user clicking on the white horizontal line, along each channel.

Figure 8:
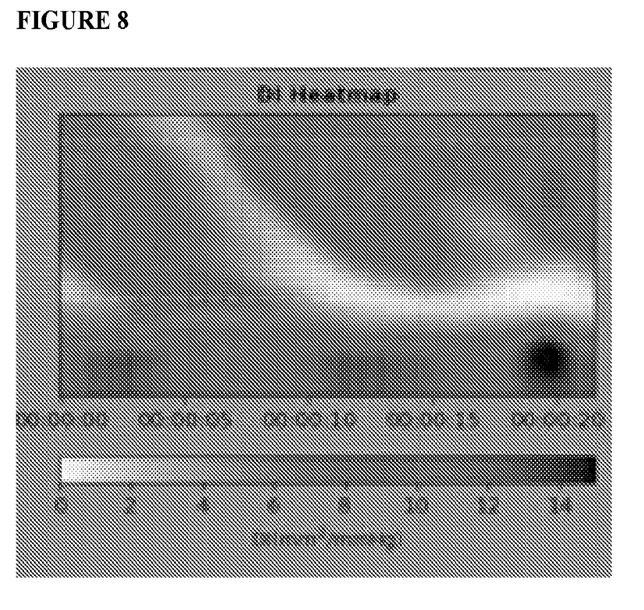
FIG. 8 shows an example of a distensibility heatmap of 16-channel diameter pressure measurements.

In another aspect, Distensibility (DI) is displayed as a 2D heatmap that shows the distribution of DI across the length of the FLIP device in form of a heatmap/topograph FIG. 8 shows one example of distensibility heatmap with 16 data channel diameter pressure measurements.

Figure 9:
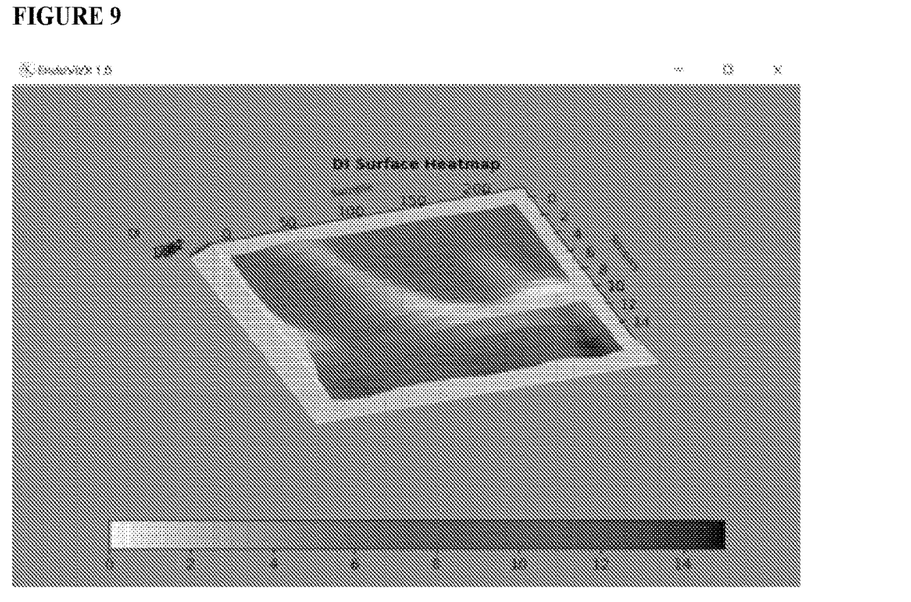
FIG. 9 shows an example of a surface representation of the distensibility heatmap.

In another aspect, Distensibility (DI) is shown as a surface (3D). The surface uses DI values for both height and color. FIG. 9 shows one example of a surface representation of the distensibility heatmap, where high values are shown as peaks and low values as valleys.

Figure 10:
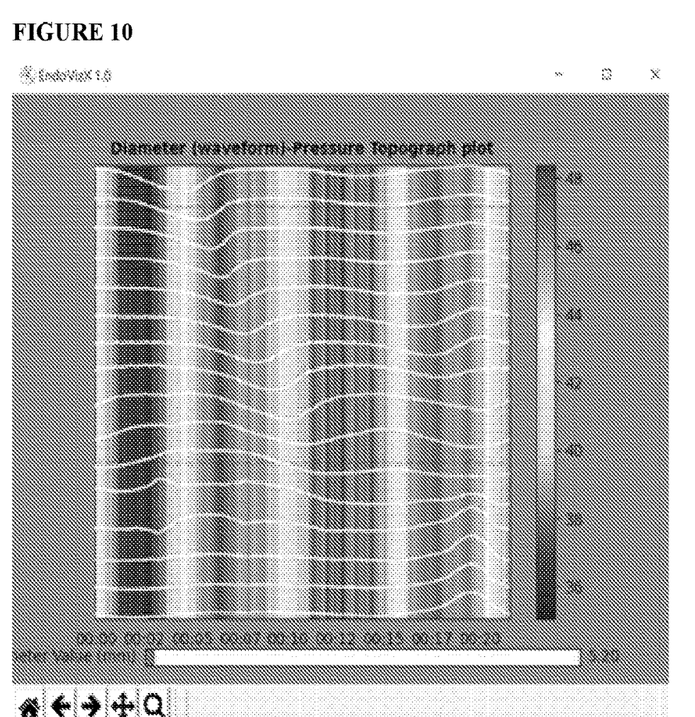
FIG. 10 shows one example of a FLIP diameter-pressure plot.

In another aspect, a new form of visualization is displayed, which is referred to as a diameter-pressure plot. In this display the pressure is displayed as a heatmap (topograph), with the diameter of bag superimposed on the pressure heatmap. FIG. 10 shows one example of a FLIP diameter-pressure plot. In this display the diameters are depicted as multiple waveforms superimposed on the pressure topograph.

In yet another aspect, the spread of the DI values across each data channel is shown as a density plot (using, e.g., kernel density estimation).

In another aspect, the distribution of tension, which is defined by pressure multiplied by radius, is shown as a heatmap or topograph.

Figure 11:
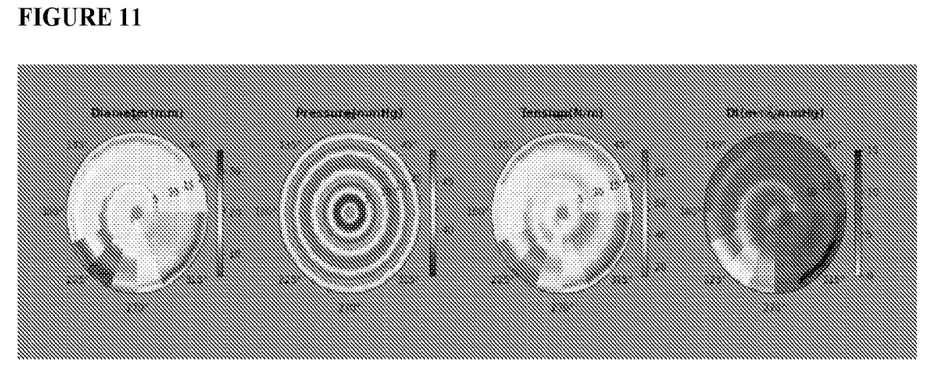
FIG. 11 shows a circular representation of the user ROIs using EndoPolar plots.

In another aspect, a new visualization, referred to as 'EndoPolar Plots,' allows the display of conventional rectangular gird images as a series of concentric circles and a new concentric circular plot designed for FLIP data where the color of the image corresponds to the radius of the circle. The visualization starts from an initial small radius circle (having 16 segments, each corresponding to a single channel). Time evolution is shown as larger circles with higher radius values. FIG. 11 shows a circular representation of user region of interests (ROIs) using EndoPolar plots. In FIG. 11 the radius denotes time, and in each of the circular rings the area is divided into 16 channels, representing different channels of the FLIP device.

Figure 12:
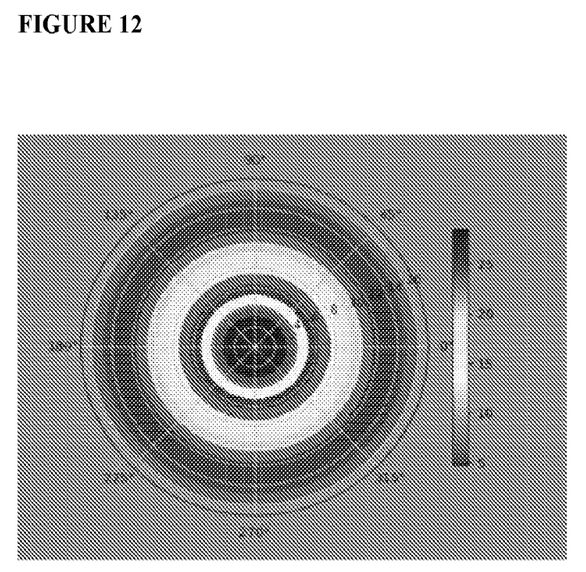
FIG. 12 shows an example of a static circular representation of a single time point diameter measurement.

In another aspect, another display, referred to as PolarD, is introduced. This is similar to the Endopolar plot, the difference being that it is depicted at only a single time point, with each concentric circle representing only one channel (unlike Endopolar plots, where one circle contains 16 segments, and each circle represent one point in time). FIG. 12 shows an example of a static circular representation of a single time point diameter measurement. That is, FIG. 12 shows an alternative static cone display of diameter measurements. In FIG. 12, each radius corresponds to a single channel, as opposed to FIG. 11, where they denote time.

In another aspect, using the user selected region of interest, the time it takes for each data channel to achieve a minimum or local minimum is calculated.

In another aspect, the user selected ROI is displayed dynamically with respect to time, as a 3D cylinder deforming with time. Channel measured diameters control the cross-sectional area of a non-equal radius cylinder. The diameter is mapped on the surface for better visualization using appropriate colormaps.

In another aspect, summary descriptive statistics of the user-selected ROI (e.g., Mean, Std, Min and Max) such as pressure, distensibility, diameter and tension are displayed.

Figure 13:
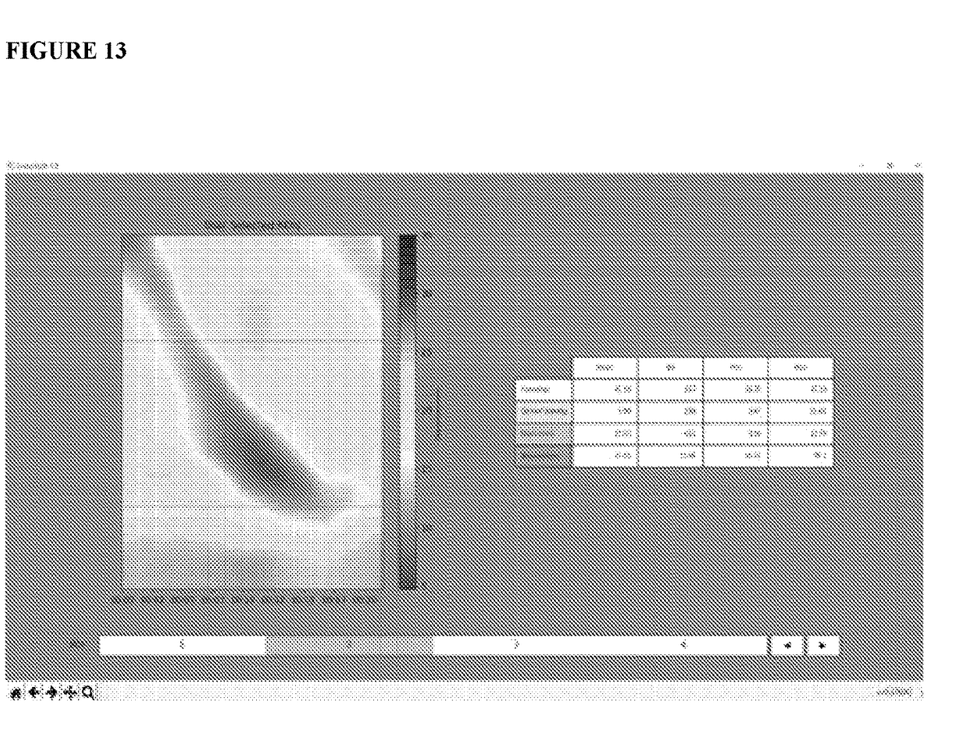
FIG. 13 shows a display of multiple user selected ROIs, which are selected either by a particular ROI number, or by using left and right arrows.

In another aspect, if the user decided to choose multiple ROIs, another button or other icon (e.g., 'review'), will appear on the display (e.g., at the bottom right-hand corner) of the analysis window, allowing the user to go through the selected diameter ROIs alongside their corresponding table of descriptive statistics. FIG. 13 shows multiple user selected ROIs that are reviewed, which are selected either by using a particular ROI number or by using left and right arrows. That is, after the selection of different user defined regions of interests, the corresponding regions, alongside their extracted statistics, will be displayed and ready to be reviewed.

In another aspect, a montage can visualize an entire diameter evolution cycle at specified time intervals. In this form of visualization, the diameter can be displayed in a cylindrical (mesh) geometry. Simultaneously, the pressure at each sensor location or Distensibility or Tension can be mapped on the mesh.

The various FLIP device parameters discussed above may be imported, visualized (displayed) and analyzed on any suitable and convenient computer processing device, including, without limitation, personal computers, tablets, smartphones, smart glasses and other hand-held or wearable devices.

Figure 14:
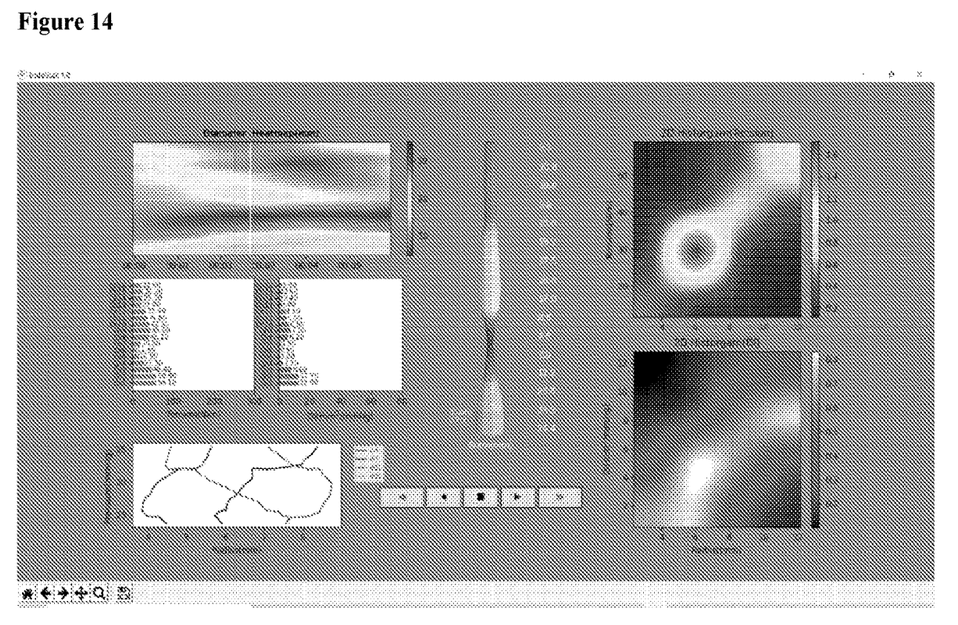
FIG. 14 shows an example of various displays for the simultaneous visualization and estimation of various physiological features, including tension, distensibility and dynamic evolution of radius across channels versus pressure with time.

FIG. 14 shows an example of various displays for the simultaneous visualization and estimation of various physiological features, including tension, distensibility and dynamic evolution of radius across channels versus pressure with time. In particular, FIG. 14 shows the simultaneous dynamic display (with video playback abilities) of a diameter heatmap alongside distension and tension, which are presented as bar charts. Also, the cumulative 2D histograms of tension and distensibility with time. Also displayed are pressure radius loops along 4 channels to observe the dynamic evolution of pressure and radius with time.

Various embodiments described herein may be described in the general context of method steps or processes, which may be implemented in one embodiment by a computer program product, embodied in, e.g., a non-transitory computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

A computer program product can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The various embodiments described herein may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques. In some cases, the environments in which various embodiments described herein are implemented may employ machine-learning and/or artificial intelligence techniques to perform the required methods and techniques.

The above examples and disclosure are intended to be illustrative and not exhaustive. These examples and description will suggest many variations and alternatives to one of ordinary skill in this art. For instance, while the examples described above has illustrated the systems and techniques described herein as being applicable to measurements associated with the esophagus, more generally these systems and techniques are equally applicable to any portion of the gastrointestinal tract. All these alternatives and variations are intended to be included within the scope of the attached claims. Those familiar with the art may recognize other equivalents to the specific embodiments described herein, and those equivalents are also intended to be encompassed by the claims attached hereto.

The invention claimed is:

1. A non-transitory computer-readable medium, comprising instructions for causing a computing environment to perform a method for analyzing and displaying functional lumen imaging probe (FLIP) measurement data, comprising:
   receiving multi-channel time-series FLIP sensor data from a plurality of FLIP sensor channels;
   processing the multi-channel time-series FLIP sensor data to compute per-channel diameter/radius values and distensibility values;
   generating and displaying a heatmap or topograph of the computed per-channel diameter values to create an image of a diameter along the lumen;
   displaying a waveform of the pressure time series from the FLIP sensor;
   tracking one or more points of minimal distension across the multi-channel time series FLIP sensor data; and in response to user input specifying a diameter value range, displaying only data corresponding to diameter values within the user-specified range in both 2D and 3D.

2. The non-transitory computer-readable medium of claim 1 wherein the lumen is selected from the group including esophageal, vaginal or anal canal.

3. The non-transitory computer-readable medium of claim 1 further comprising displaying one or more parameter values derived from the FLIP measurement data in response to a user selection of a portion of the heatmap or topograph, the parameter values being selected from the group including pressure, diameter, distensibility, tension and volume.

4. The non-transitory computer-readable medium of claim 1 further comprising generating a display that simultaneously presents distensibility and diameter values of the lumen.

5. The non-transitory computer-readable medium of claim 1 further comprising panning or zooming a portion of the diameter image in accordance with a user request.

6. The non-transitory computer-readable medium of claim 1 further comprising generating and displaying a time derivative heatmap of the image of the diameter of the lumen.

7. The non-transitory computer-readable medium of claim 1 further comprising simultaneously displaying the image of the diameter of the lumen and pressure-radius loops.

8. The non-transitory computer-readable medium of claim 1 further comprising simultaneously displaying the image of the diameter of the lumen and tension-radius loops.

9. The non-transitory computer-readable medium of claim 1 further comprising simultaneously displaying pressure-radius-tension-distensibility waveforms.

10. The non-transitory computer-readable medium of claim 1 further comprising generating and displaying a 2D heatmap of distensibility.

11. The non-transitory computer-readable medium of claim 1 further comprising generating and displaying a 3D heatmap of distensibility.

12. The non-transitory computer-readable medium of claim 1 further comprising generating and displaying a diameter-pressure plot with pressure being displayed as a heatmap and diameter for each data channel being superimposed on the heatmap of pressure.

13. The non-transitory computer-readable medium of claim 1 further comprising generating and displaying a distribution of tension as a heatmap or topograph.

14. The non-transitory computer-readable medium of claim 1 further comprising generating and displaying grid images of the lumen as a series of concentric circles.

15. The non-transitory computer-readable medium of claim 1 further comprising generating and displaying grid images of the lumen as a series of concentric circles that represent a single point in time, each of the concentric circles being representing a single data channel.

16. The non-transitory computer-readable medium of claim 1, further comprising generating and displaying the heatmap or topograph on a hand held or wearable device.

* * * * *